Figure 1:
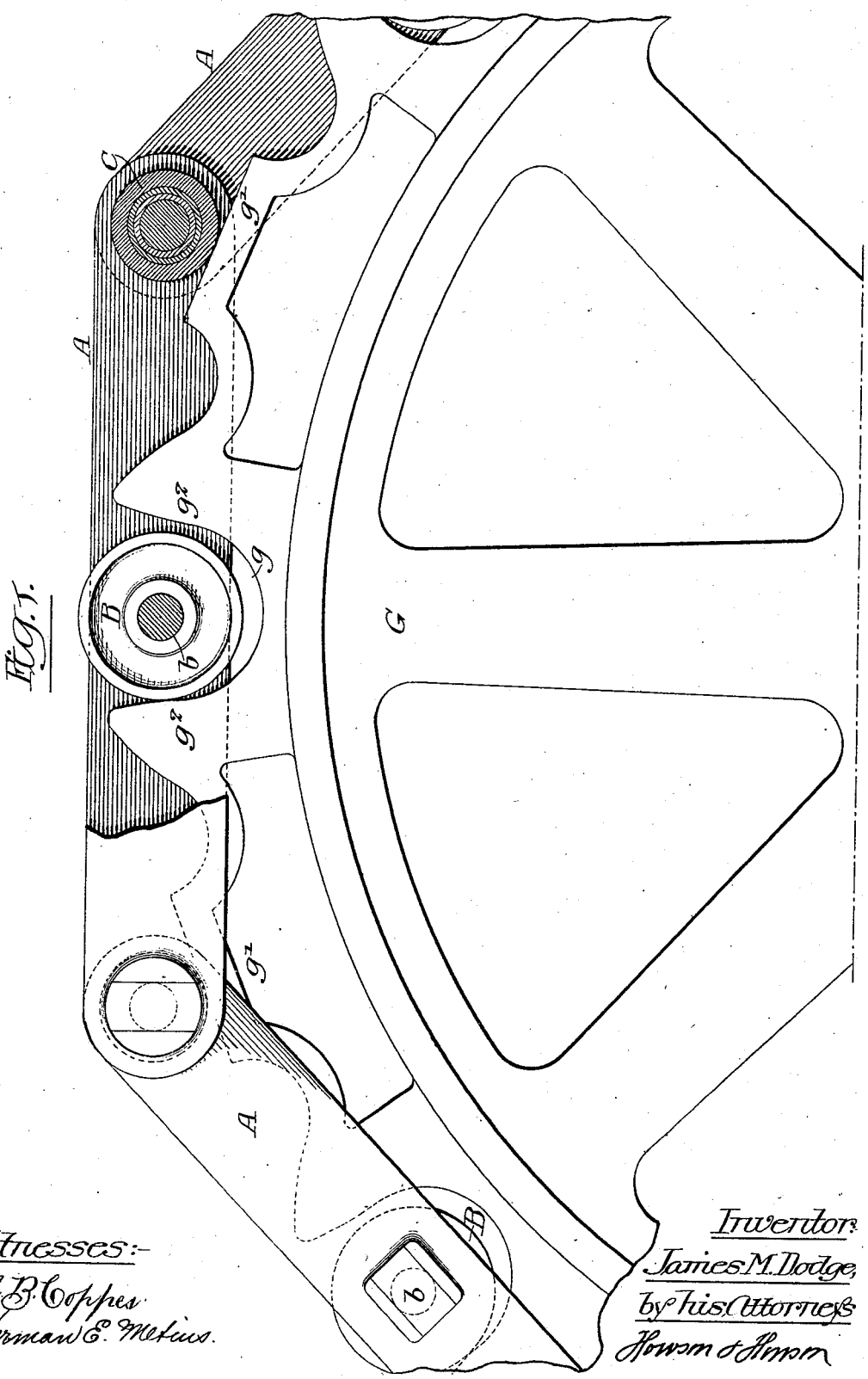

No. 715,562.  
J. M. DODGE.  
DRIVE CHAIN.  
(Application filed Oct. 10, 1901.)

(No Model.)

Patented Dec. 9, 1902.

2 Sheets—Sheet 1.

Witnesses:  
A. B. Coppes  
Herman E. Metius.

Inventor:  
James M. Dodge,  
by his Attorneys  
Howson & Howson

THE NORRIS PETERS CO., PHOTO-LITHO., WASHINGTON, D. C.

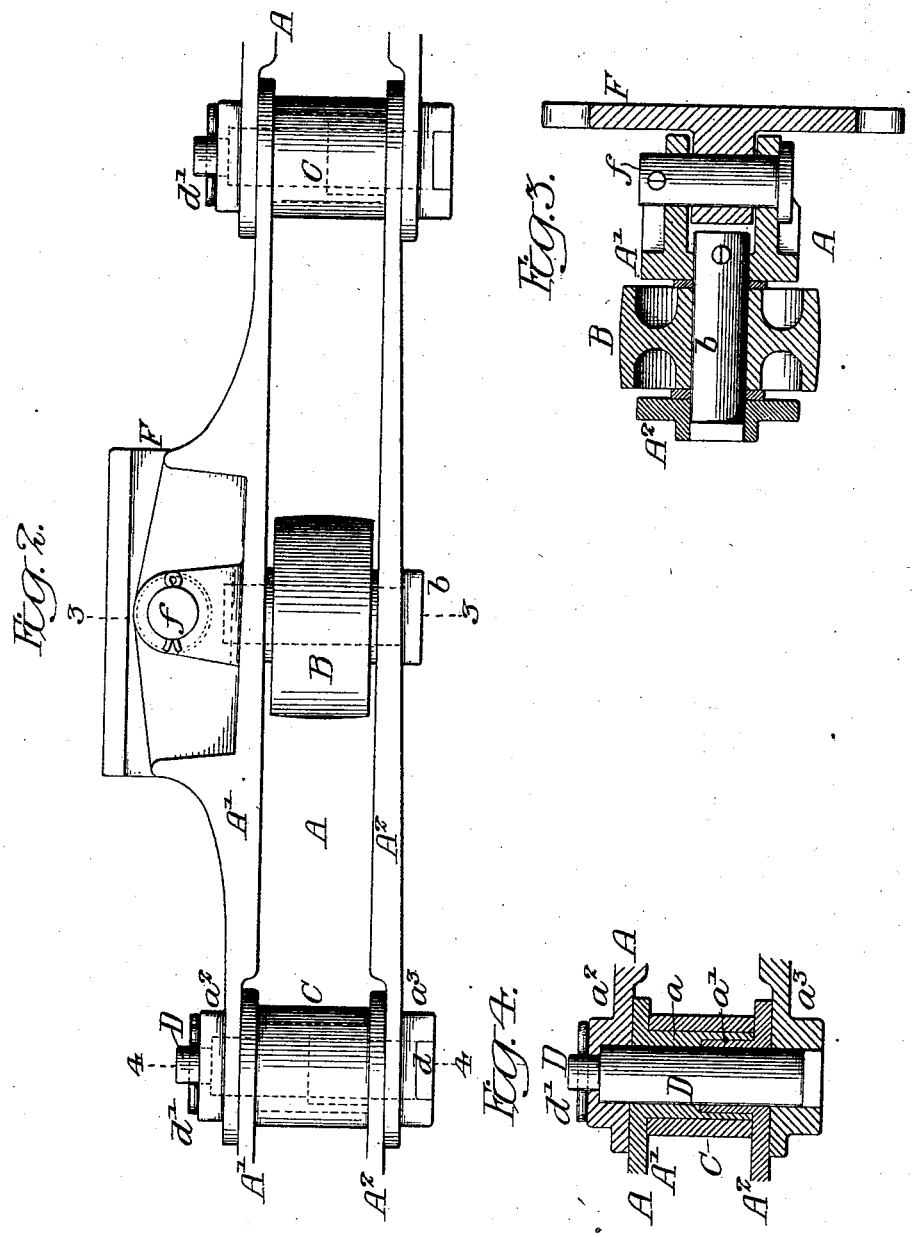

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DRIVE-CHAIN.

SPECIFICATION forming part of Letters Patent No. 715,562, dated December 9, 1902.

Application filed October 10, 1901. Serial No. 78,205. (No model.)

*To all whom it may concern:*

Be it known that I, JAMES M. DODGE, a citizen of the United States, residing in Philadelphia, Pennsylvania, have invented certain Improvements in Drive-Chains, of which the following is a specification.

The object of my invention is to so construct a drive-chain which is used in connection with a sprocket-wheel as to reduce the wear of the chain at the pivots of the links and at the same time produce an even-running chain-gear. This object I attain by allowing the teeth of the sprocket-wheel to engage the chain at a point intermediate of the pivots of the links, as fully described hereinafter.

In the accompanying drawings, Figure 1 is a side view, partly in section, of a portion of a sprocket-wheel and drive-chain illustrating my invention. Fig. 2 is a plan view of a portion of the drive-chain. Fig. 3 is a transverse section on the line 3 3, Fig. 2; and Fig. 4 is a section on the line 4 4, Fig. 2.

A A are the links of the drive-chain. These links are made in the present instance each with two side members $A'$ $A^2$, which are spaced sufficiently apart to allow for the introduction of a driving member B, in the form of a roller in the present instance. This roller is mounted on a spindle $b$, having its bearings in the side members $A'$ $A^2$. On one end of the side member $A'$ is an extension $a$, and on the end of the member $A^2$ is an extension $a'$, one telescoping the other, so as to form a hub upon which a sleeve C can revolve. The portions $a^2$ $a^3$ on the opposite end of each link overlap one end of an adjoining link, as shown, and the pivot-pin D passes through the two parts, coupling them together. The pin in the present instance has a T-head $d$ resting in a transverse slot in the portion $a^3$ and extends through an opening in the portion $a^2$ and is held in place by a cotter-pin $d'$, as shown, although other means of fastening the pivot-pin in place may be used without departing from the invention.

F is an attachment pivoted at $f$ to the portion $A'$ of the link A, and to this attachment may be secured any suitable carrier or flight desired. This element forms no part of my present invention.

The sprocket-wheel G is recessed at $g$ $g$ for the reception of the wheels B, and between the recesses are platforms $g'$, upon which rest the rollers C at the pivots of the links. The teeth $g^2$ of the sprocket-wheel, which form the recesses $g$, are of sufficient length to engage the roller and drive the chain. It will be seen that by this construction the chain is simply supported on a platform at the pivot-points of the links, while the teeth of the sprocket-wheel engage the link intermediate of the pivots.

It will be understood that while I have shown a roller mounted on a pin carried by a link a simple pin may be used or a driving member may be formed directly upon the link, and while I have shown in the drawings each link provided with driving members some of the links may be plain.

I claim as my invention—

1. In a driving-gear, the combination of a sprocket-wheel having a series of platforms on its periphery and recessed between the platforms to form driving-teeth, a chain made up of a series of links pivoted together, said pivots resting upon the platforms of the wheel, and having intermediate driving members resting in the recesses between the platforms and driven by one series of teeth formed by the recesses, substantially as described.

2. In a driving-gear, the combination of a sprocket-wheel having a series of platforms on its periphery, a series of recesses alternating with the platforms forming driving-teeth, a chain made up of a series of open links pivoted together, the pivots of the chain resting upon the platforms, and having intermediate driving members extending from one side member of a link to the other and on a line with the pivots of the chain, said drive members resting in the recesses of the wheel and driven by one series of teeth, substantially as described.

In testimony whereof I have signed my name to this specification in the presence of two subscribing witnesses.

JAMES M. DODGE.

Witnesses:
   WILL. A. BARR,
   JOS. H. KLEIN.